(12) United States Patent
Yang et al.

(10) Patent No.: US 11,012,261 B2
(45) Date of Patent: May 18, 2021

(54) ASSOCIATING VXLANS WITH TUNNELS

(71) Applicant: Hewlett Packard Enterprise Development LP, Houston, TX (US)

(72) Inventors: Jun Yang, Beijing (CN); Hui Cao, Beijing (CN); Fengshan Du, Beijing (CN); Wei Guo, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 15/511,666

(22) PCT Filed: Sep. 21, 2015

(86) PCT No.: PCT/CN2015/090078
§ 371 (c)(1),
(2) Date: Mar. 16, 2017

(87) PCT Pub. No.: WO2016/041525
PCT Pub. Date: Mar. 24, 2016

(65) Prior Publication Data
US 2017/0302476 A1    Oct. 19, 2017

(30) Foreign Application Priority Data
Sep. 19, 2014 (CN) .......................... 201410481700.7

(51) Int. Cl.
*H04L 12/46* (2006.01)
(52) U.S. Cl.
CPC ...... *H04L 12/4679* (2013.01); *H04L 12/4633* (2013.01); *H04L 12/4641* (2013.01); *H04L 12/4683* (2013.01)

(58) Field of Classification Search
CPC .................................................. H04L 12/4679
(Continued)

(56) References Cited

U.S. PATENT DOCUMENTS

2007/0208937 A1* 9/2007 Cam-Winget ........ H04L 9/0844
713/168
2013/0174246 A1   7/2013 Schrecker et al.
(Continued)

FOREIGN PATENT DOCUMENTS

CN     103200085 B     7/2013
CN     103780470       5/2014
(Continued)

OTHER PUBLICATIONS

Callon, R., "Use of OSI IS-IS for Routing in TCP/IP and Dual Environments", Network Working Group, Request for Comments: 1195, Dec. 1990, 60 pages.
(Continued)

*Primary Examiner* — Kevin T Bates
*Assistant Examiner* — Emad Siddiqi (57) ABSTRACT

Via a tunnel configured on a Virtual eXtensible Local Area Network (VXLAN) Tunnel End Point (VTEP), a notification message is received from a peer VTEP over the tunnel. The received notification message contains VXLAN Network Identifiers (VNIs) of VXLANs currently configured on the peer VTEP. For each of VXLANs currently configured on the VTEP, when the same VXLAN as the VXLAN configured on the VTEP exists in the VXLANs indicated by the VNIs contained in the received notification message and when the VXLAN configured on the VTEP has not been associated with the tunnel, the VXLAN configured on the VTEP is associated with the tunnel.

12 Claims, 4 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 2013/0311663 | A1* | 11/2013 | Kamath | ............... H04L 67/14 |
| | | | | 709/227 |
| 2014/0254603 | A1 | 9/2014 | Banavalikar et al. | |
| 2015/0058470 | A1* | 2/2015 | Duda | ............... H04L 12/4633 |
| | | | | 709/224 |
| 2015/0063353 | A1* | 3/2015 | Kapadia | ............... H04L 45/745 |
| | | | | 370/392 |
| 2015/0117256 | A1* | 4/2015 | Sabaa | ............... H04L 12/4633 |
| | | | | 370/254 |
| 2016/0028557 | A1* | 1/2016 | Dong | ............... H04L 45/08 |
| | | | | 370/395.53 |

FOREIGN PATENT DOCUMENTS

| | | |
|---|---|---|
| CN | 103841023 B | 6/2014 |
| CN | 103841028 B | 6/2014 |
| CN | 103916303 A | 7/2014 |
| CN | 103986638 A | 8/2014 |
| CN | 104243268 | 12/2014 |
| CN | 104767666 | 7/2015 |

OTHER PUBLICATIONS

International Search Report and Written Opinion dated Dec. 17, 2015, PCT Patent Application No. PCT/CN2015/090078 dated Sep. 21, 2015, State Intellectual Property Office of the P R China.

Mahalingam et al., "VXLAN: A Framework for Overlaying Virtualized Layer 2 Networks Over Layer 3 Networks", Internet Engineering Task Force, Apr. 10, 2014, 23 pages.

* cited by examiner

ASSOCIATING VXLANS WITH TUNNELS

BACKGROUND

Virtual eXtensible Local Area Network (VXLAN) is an overlay network technology, in which a message is encapsulated according to a Media Access Control (MAC) in User Datagram Protocol (UDP) method. For example, an initial message may be encapsulated into a UDP message.

A VXLAN Tunnel End Point (VTEP) is an edge device of a VXLAN, and may be implemented by a physical switch or a virtual switch. Any two VTEPs may be connected across a layer 3 network and communicate with each other through establishing a tunnel between them. A VXLAN is identified by a VXLAN Network Identifier (VNI). The length of the VNI may be 24 bits. The VXLAN is implemented through a tunnel. Accordingly, after the VXLAN and the tunnel are configured on the VTEP respectively, the VXLAN should be associated or bundled with the tunnel.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to.

A method for associating a VXLAN with a tunnel and an apparatus applying the method are provided according to various examples of the present disclosure. When the number of VXLANs and tunnels on a VTEP is large, workload for associating the VXLANs with the tunnels can be reduced by the method and the apparatus provided according to the examples of the present disclosure. Further, errors caused by manual association can be reduced.

Figure 1:
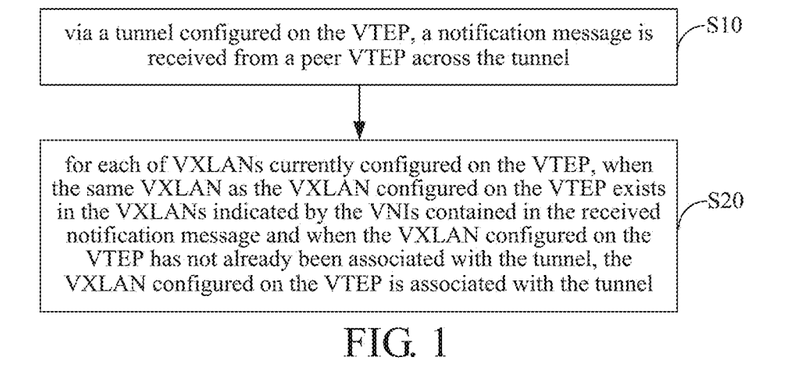
FIG. 1 is a flowchart illustrating a method for associating a VXLAN with a tunnel according to an example of the present disclosure.

FIG. 1 is a flowchart illustrating a method for associating a VXLAN with a tunnel according to an example of the present disclosure. The method may be applied to any VTEP in a VXLAN. As shown in FIG. 1, the method includes following blocks.

At block S10, via a tunnel configured on the VTEP, a notification message is received from a peer VTEP over the tunnel. The received notification message contains VNIs of VXLANs currently configured on the peer VTEP.

At block S20, for each of VXLANs currently configured on the VTEP, when the same VXLAN as the VXLAN configured on the VTEP exists in the VXLANs indicated by the VNIs contained in the received notification message and when the VXLAN configured on the VTEP has not already been associated with the tunnel, the VXLAN configured on the VTEP is associated with the tunnel.

The method for associating a VXLAN with a tunnel may be performed by any VTEP in a VXLAN. Any VTEP may configure VXLANs and tunnels locally. The VTEP sends, via each of the configured tunnels, a notification message to a peer VTEP over the tunnel. The sent notification message may contain VNIs of all VXLANs currently configured on the VTEP. When the VXLANs configured on the VTEP change, for example, a new VXLAN is added or a VXLAN is removed, the VTEP sends, via each of the configured tunnels, a notification message to a peer VTEP over the tunnel. The sent notification message may contain VNIs of all VXLANs currently configured on the VTEP. Accordingly, any VTEP may receive, via any tunnel configured locally, a notification message from a peer VTEP over the tunnel.

Figure 2:
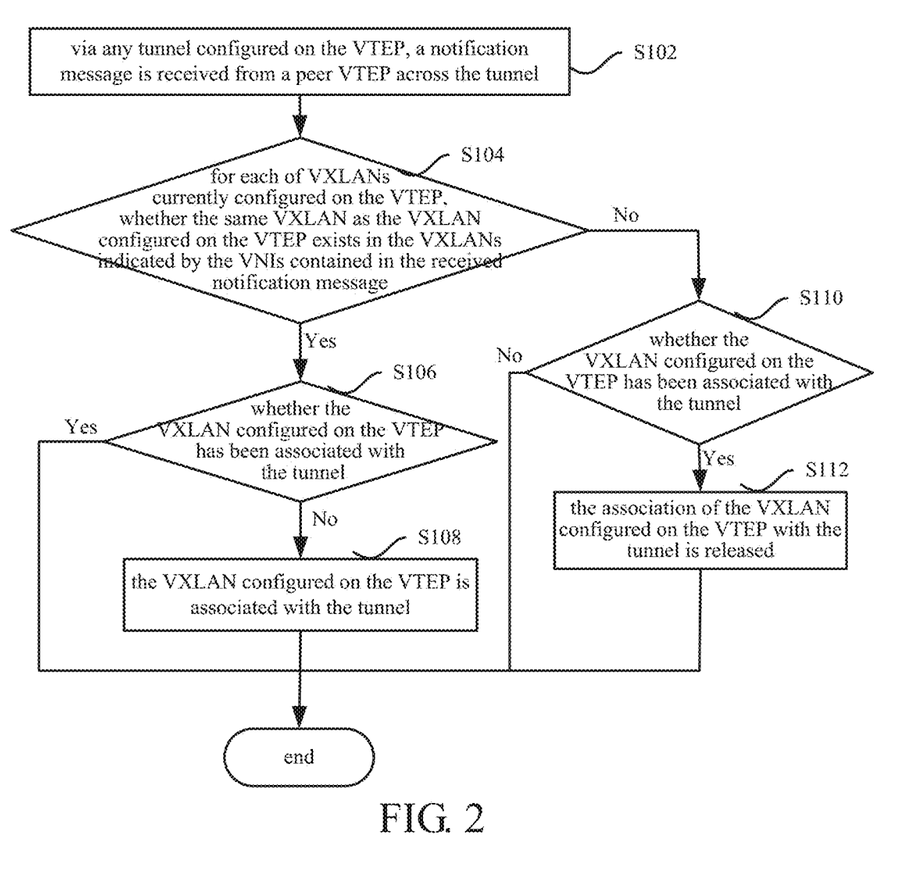
FIG. 2 is a flowchart illustrating a method for associating a VXLAN with a tunnel according to another example of the present disclosure.

FIG. 2 is a flowchart illustrating a method for associating a VXLAN with a tunnel according to another example of the present disclosure. The method may be applied to any VTEP in a VXLAN. As shown in FIG. 2, the VTEP performs following blocks.

At block S102, via any tunnel configured on the VTEP, a notification message is received from a peer VTEP over the tunnel. The received notification message contains VNIs of all VXLANs currently configured on the peer VTEP.

At block S104, for each of VXLANs currently configured on the VTEP, it is determined whether the same VXLAN as the VXLAN configured on the VTEP exists in the VXLANs indicated by the VNIs contained in the received notification message. If the same VXLAN as the VXLAN configured on the VTEP exists in the VXLANs indicated by the VNIs contained in the received notification message, block S106 is performed; otherwise, block S110 is performed.

At block S106, it is determined whether the VXLAN configured on the VTEP has already been associated with the tunnel via which the notification message is received. If the VXLAN configured on the VTEP has not already been associated with the tunnel via which the notification message is received, block S108 is performed; otherwise, the process of associating the VXLAN configured on the VTEP with the tunnel is terminated.

At block S108, the VXLAN configured on the VTEP is associated with the tunnel.

At block S110, it is determined whether the VXLAN configured on the VTEP has already been associated with the tunnel via which the notification message is received. If the VXLAN configured on the VTEP has already been associated with the tunnel via which the notification message is received, block S112 is performed; otherwise, the process of associating the VXLAN configured on the VTEP with the tunnel is terminated.

At block S112, the association of the VXLAN configured on the VTEP with the tunnel is released.

It is supposed that a first set is composed of all VXLANs currently configured on the VTEP and a second set is composed of the VXLANs indicated by the VNIs contained in the received notification message. According to the above blocks, an intersection of the first set and the second set may be obtained. If the intersection is non-null, all VXLANs configured on the VTEP that belong to the intersection and have not already been associated with the tunnel via which the notification message is received are associated with the tunnel. If the intersection is null and all VXLANs currently configured on the VTEP have not already been associated with the tunnel, the tunnel via which the notification message is received is unable to be associated with any VXLAN currently configured on the VTEP.

If a VXLAN that belong to the first set but does not belong to the second set has already been associated with the tunnel, the association of the VXLAN with the tunnel is released.

In an example, the notification message may be implemented by an Intermediate System to Intermediate System (ISIS) Link State Protocol data unit (LSP) message or another network protocol message. If the notification message is implemented by the ISIS LSP message, any VTEP configures VXLANs and tunnels locally and enables an ISIS protocol. The tunnels belong to a VXLAN type. The VTEP establishes, via each of the tunnels configured locally, an ISIS neighbor relationship with a peer VTEP over the tunnel. Any VTEP may establish, via a tunnel configured on the VTEP, an ISIS neighbor relationship with a peer VTEP over the tunnel. Afterwards, VNIs of all VXLANs currently configured on the VTEP may be encapsulated into an ISIS LSP message. Via each tunnel configured on the VTEP, the ISIS LSP message is sent to a peer VTEP over the tunnel, where the peer VTEP is an ISIS neighbor of the VTEP. The peer VTEP receives the ISIS LSP message via the tunnel, and performs blocks S102 to S112, so as to implement automatic association of the VXLAN with the tunnel and association release.

The ISIS LSP message includes a message header and a message body. The message body includes a TLV for containing all kinds of information. In an example, a new type of TLV may be defined, which may contain the VNIs of the VXLANs.

Figure 3:
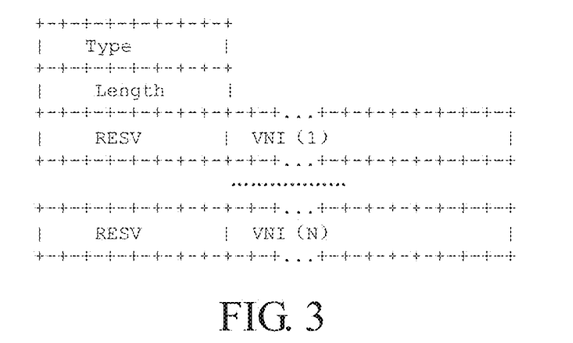
FIG. 3 is a diagram illustrating a format of Type Length Value (TLV) for containing the VNI of a VXLAN according to an example of the present disclosure.

As shown in FIG. 3, the new type of TLV may include following fields.

A Type field may indicate the type of TLV. When the value of the Type field is set as a specific value, the Type field indicates that the TLV may contain VNIs of VXLANs. For example, the specific value may be 181, and the length of the Type field may be 1 byte.

A Length field may contain the length of a Value field. The length of the Length fields may be 1 byte.

The Value field may contain VNIs of VXLANs. The length of the Value field may be 4×N bytes. The first byte of every 4 bytes is a reservation (RESV) and the last 3 bytes of every 4 bytes are VNIs. The RESV may be filled with 0.

In the solution of the present disclosure, any VTEP may send, via any tunnel configured on the VTEP, to a peer VTEP over the tunnel a notification message containing VNIs of all VXLANs currently configured on the VTEP. Accordingly, any VTEP may receive, via any tunnel configured on the VTEP, from a peer VTEP over the tunnel a notification message containing VNIs of all VXLANs currently configured on the peer VTEP. Afterwards, for each of VXLANs currently configured on the VTEP, when the same VXLAN as the VXLAN configured on the VTEP exists in the VXLANs indicated by the VNIs contained in the received notification message and when the VXLAN configured on the VTEP has not already been associated with the tunnel, the VXLAN configured on the VTEP is associated with the tunnel. Accordingly, the VTEPs at both ends of the tunnel may dynamically negotiate VXLANs that can be associated with the tunnel, so as to implement the automatic association of the VXLANs configured on the VTEP with the tunnel. When the number of VXLANs and tunnels on the VTEP is large, workload for associating the VXLANs with the tunnels can be reduced by the solution of the present disclosure. Further, the configuration complexity of VXLANs may be decreased, configuration accuracy may be improved, and the management, maintenance and operation of VXLANs become easy.

When the same VXLAN as the VXLAN configured on the VTEP does not exist in the VXLANs indicated by the VNIs contained in the received notification message and when the VXLAN configured on the VTEP has already been associated with the tunnel, the association of the VXLAN configured on the VTEP with the tunnel is released. Accordingly, when a VXLAN configured on the peer VTEP is removed, the association of a VXLAN configured on the VTEP with the tunnel via which the notification message is received may be released automatically, where the VXLAN configured on the VTEP is the same as the removed VXLAN.

A tunnel may be associated with VXLANs configured on both VTEPs at both ends of the tunnel, so as to ensure that the VXLAN is reachable at both ends of the tunnel.

Figure 4:
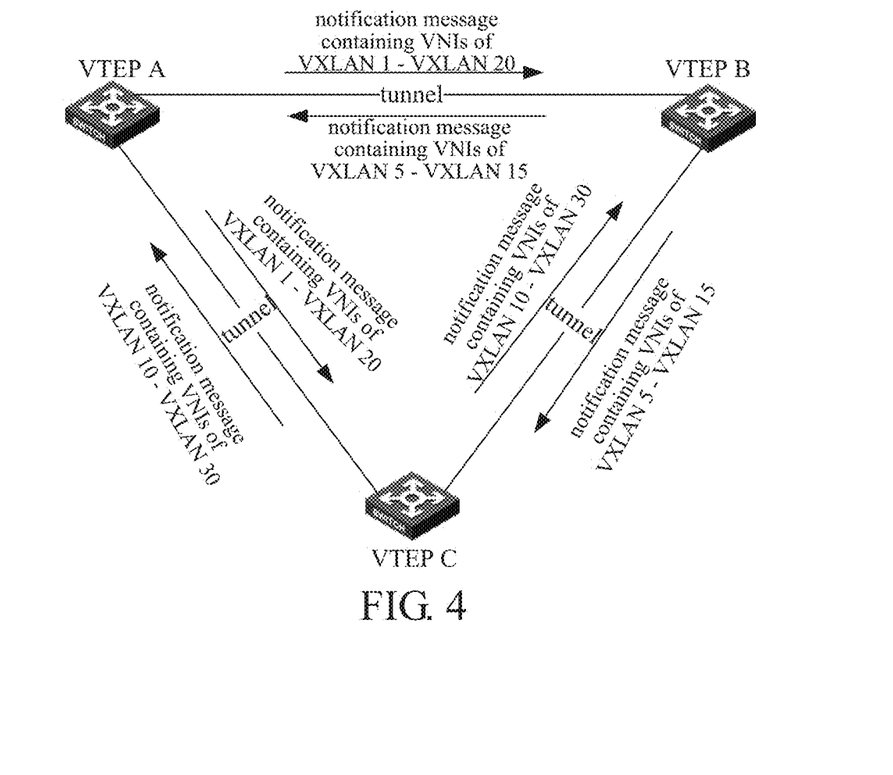
FIG. 4 is a diagram illustrating the structure of a VXLAN according to an example of the present disclosure.

FIG. 4 is a diagram illustrating the structure of a VXLAN according to an example of the present disclosure. As shown in FIG. 4, the VXLAN includes VTEP A, VTEP B and VTEP C. VTEP A is configured with TUNNEL 1 and TUNNEL 2 of VXLAN type and VXLAN 1-VXLAN 20. A destination IP address of TUNNEL 1 is the IP address of VTEP B, and a destination IP address of TUNNEL 2 is the IP address of VTEP C. VTEP B is configured with TUNNEL 1 and TUNNEL 2 of VXLAN type and VXLAN 5-VXLAN 15. A destination IP address of TUNNEL 1 is the IP address of VTEP A, and a destination IP address of TUNNEL 2 is the IP address of VTEP C. VTEP C is configured with TUNNEL 1 and TUNNEL 2 of VXLAN type and VXLAN 10-VXLAN 30. A destination IP address of TUNNEL 1 is the IP address of VTEP A, and a destination IP address of TUNNEL 2 is the IP address of VTEP B. TUNNEL 1 and TUNNEL 2 are configured locally for each of VTEP A. VTEP B and VTEP C, rather than configured globally. Logically, TUNNEL 1 configured for VTEP A and TUNNEL 1 configured for VTEP B are the same tunnel, for example, the tunnel between VTEP A and VTEP B as shown in FIG. 4. TUNNEL 2 configured for VTEP A and TUNNEL 1 configured for VTEP C are the same tunnel, for example, the tunnel between VTEP A and VTEP C as shown in FIG. 4. TUNNEL 2 configured for VTEP B and TUNNEL 2 configured for VTEP C are the same tunnel, for example, the tunnel between VTEP B and VTEP C as shown in FIG. 4.

VTEP A establishes an ISIS neighbor relationship with VTEP B via TUNNEL 1 configured on VTEP A, and establishes an neighbor relationship, e.g. an ISIS neighbor relationship, with VTEP C via TUNNEL 2 configured on VTEP A. VTEP B establishes an ISIS neighbor relationship with VTEP A via TUNNEL 1 configured on VTEP B, and establishes an ISIS neighbor relationship with VTEP C via TUNNEL 2 configured on VTEP B. VTEP C establishes an ISIS neighbor relationship with VTEP A via TUNNEL 1 configured on VTEP C, and establishes an ISIS neighbor relationship with VTEP B via TUNNEL 2 configured on VTEP C.

VTEP A exchanges notification messages, e.g. ISIS LSP messages, with VTEP B. Via TUNNEL 1 configured on VTEP A, VTEP A sends to VTEP B an ISIS LSP message containing VNIs of VXLAN 1-VXLAN 20. Via TUNNEL 1 configured on VTEP B. VTEP B send to VTEP A an ISIS LSP message containing VNIs of VXLAN 5-VXLAN 15. After receiving the ISIS LSP message from VTEP B via TUNNEL 1, VTEP A finds that VNIs of VXLAN 5-VXLAN 15 configured on VTEP A are the same as those contained in the received ISIS LSP message, and associates VXLAN 5-VXLAN 15 configured on VTEP A with TUNNEL 1. After receiving the ISIS LSP message from VTEP A via TUNNEL 1, VTEP B finds that VNIs of VXLAN 5-VXLAN 15 configured on VTEP B are the same as those contained in the received ISIS LSP message, and associates VXLAN 5-VXLAN 15 configured on VTEP B with TUNNEL 1.

VTEP A exchanges ISIS LSP messages with VTEP C. Via TUNNEL 2 configured on VTEP A, VTEP A sends to VTEP C an ISIS LSP message containing VNIs of VXLAN 1-VXLAN 20. Via TUNNEL 1 configured on VTEP C, VTEP C sends to VTEP A an ISIS LSP message containing VNIs of VXLAN 10-VXLAN 30. After receiving the ISIS LSP message from VTEP C via TUNNEL 2. VTEP A finds that VNIs of VXLAN 10-VXLAN 20 configured on VTEP A are the same as those contained in the received ISIS LSP message, and associates VXLAN 10-VXLAN 20 configured on VTEP A with TUNNEL 2. After receiving the ISIS LSP message from VTEP A via TUNNEL 1. VTEP C finds that VNIs of VXLAN 10-VXLAN 20 configured on VTEP C are the same as those contained in the received ISIS LSP message, and associates VXLAN 10-VXLAN 20 configured on VTEP C with TUNNEL 1.

VTEP B exchanges ISIS LSP messages with VTEP C. Via TUNNEL 2 configured on VTEP B, VTEP B sends to VTEP C an ISIS LSP message containing VNIs of VXLAN 5-VXLAN 15. Via TUNNEL 2 configured on VTEP C, VTEP C sends to VTEP B an ISIS LSP message containing VNIs of VXLAN 10-VXLAN 30. After receiving the ISIS LSP message from VTEP C via TUNNEL 2, VTEP B finds that VNIs of VXLAN 10-VXLAN 15 configured on VTEP B are the same as those contained in the received ISIS LSP message, and associates VXLAN 10-VXLAN 15 configured on VTEP B with TUNNEL 2. After receiving the ISIS LSP message from VTEP B via TUNNEL 2, VTEP C finds that VNIs of VXLAN 10-VXLAN 15 configured on VTEP C are the same as those contained in the received ISIS LSP message, and associates VXLAN 10-VXLAN 15 configured on VTEP C with TUNNEL 2.

If later, the VXLAN 10 configured on VTEP A is removed, VTEP A sends, via TUNNEL 1 configured on VTEP A, to VTEP B an ISIS LSP message containing VNIs of VXLAN 1-VXLAN 9 and VXLAN 11-VXLAN 20, and sends, via TUNNEL 2 configured on VTEP A, to VTEP C an ISIS LSP message containing VNIs of VXLAN 1-VXLAN 9 and VXLAN 11-VXLAN 20.

After receiving the ISIS LSP message from VTEP A via TUNNEL 1 configured on VTEP B, VTEP B finds that VNIs of VXLAN 5-VXLAN 9 and VXLAN 11-VXLAN 15 configured on VTEP B are the same as those contained in the received ISIS LSP message and VXLAN 5-VXLAN 9 and VXLAN 11-VXLAN 15 configured on VTEP B have already been associated with TUNNEL 1, VTEP B does not associate VXLAN 5-VXLAN 9 and VXLAN 11-VXLAN 15 configured on VTEP B with TUNNEL 1. VTEP B also finds that the received ISIS LSP message does not contain the VNI of VXLAN 10 but VXLAN 10 is configured on VTEP B and has already been associated with TUNNEL 1, VTEP B releases the association of VXLAN 10 with TUNNEL 1.

After receiving the ISIS LSP message from VTEP A via TUNNEL 1 configured on VTEP C, VTEP C finds that VNIs of VXLAN 11-VXLAN 20 configured on VTEP C are the same as those contained in the received ISIS LSP message and VXLAN 11-VXLAN 20 configured on VTEP C have already been associated with TUNNEL 1. VTEP C does not associate VXLAN 11-VXLAN 20 configured on VTEP C with TUNNEL 1. VTEP C also finds that the received ISIS LSP message does not contain the VNI of VXLAN 10 but VXLAN 10 is configured on VTEP C and has already been associated with TUNNEL 1, VTEP C releases the association of VXLAN 10 with TUNNEL 1.

Figure 5:
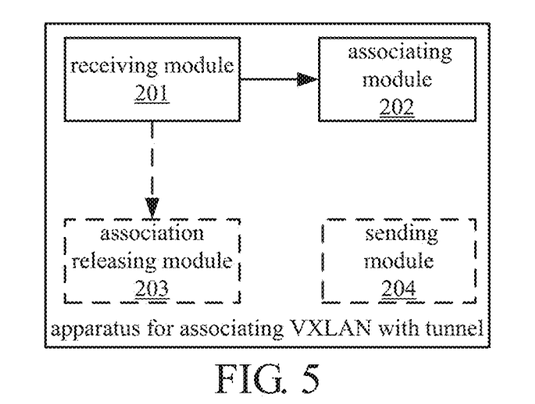
FIG. 5 is a diagram illustrating the structure of an apparatus for associating a VXLAN with a tunnel according to an example of the present disclosure.

FIG. 5 is a diagram illustrating the structure of an apparatus for associating a VXLAN with a tunnel according to an example of the present disclosure. The apparatus may be applied to a VTEP in a VXLAN.

As shown in FIG. 5, the apparatus includes a receiving module 201 and an associating module 202.

The receiving module 201 may receive, via a tunnel configured on the VTEP, a notification message from a peer VTEP over the tunnel. The received notification message contains VNIs of all VXLANs currently configured on the peer VTEP.

For each of VXLANs currently configured on the VTEP, when the same VXLAN as the VXLAN configured on the VTEP exists in the VXLANs indicated by the VNIs contained in the received notification message and when the VXLAN configured on the VTEP has not already been associated with the tunnel, the associating module 202 may associate the VXLAN configured on the VTEP with the tunnel.

In an example, the apparatus further includes an association releasing module 203 and a sending module 204.

For each of VXLANs currently configured on the VTEP, when the same VXLAN as the VXLAN configured on the VTEP does not exist in the VXLANs indicated by the VNIs contained in the notification message received by the receiving module 201 and when the VXLAN configured on the VTEP has already been associated with the tunnel, the association releasing module 203 may release the association of the VXLAN configured on the VTEP with the tunnel.

When the VXLANs currently configured on the VTEP change, for each of the tunnels configured on the VTEP, the sending module 204 may send, via the tunnel, a notification message to a peer VTEP over the tunnel. The sent notification message contains VNIs of all VXLANs currently configured on the VTEP.

In an example, the notification message may be an ISIS LSP message. A TLV in the ISIS LSP message contains the VNIs of all VXLANs currently configured on the VTEP sending the ISIS LSP message.

Figure 6:
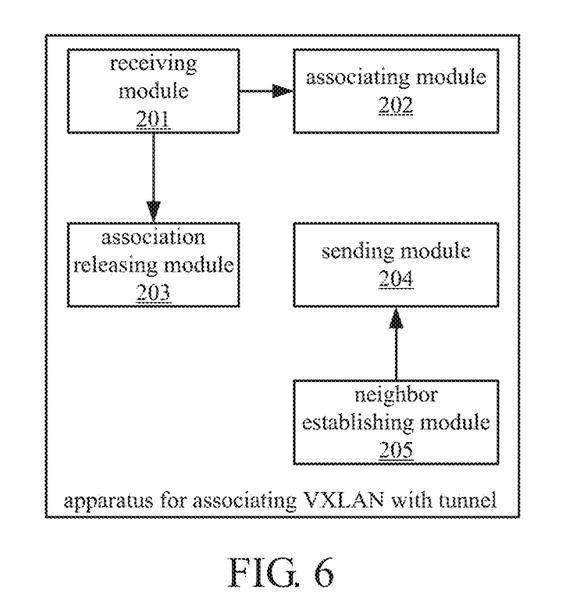
FIG. 6 is a diagram illustrating the structure of an apparatus for associating a VXLAN with a tunnel according to another example of the present disclosure.

FIG. 6 is a diagram illustrating the structure of an apparatus for associating a VXLAN with a tunnel according to another example of the present disclosure. The apparatus may also be applied to a VTEP in a VXLAN. As shown in FIG. 6, the apparatus includes a receiving module 201, an associating module 202, an association releasing module 203 and a sending module 204. The functions of these modules are the same as those of modules shown in FIG. 5. The apparatus shown in FIG. 6 further includes a neighbor establishing module 205. Before the sending module 204 sends, via each of tunnels configured on the VTEP, the ISIS LSP message to a peer VTEP over the tunnel, the neighbor establishing module 205 establishes an ISIS neighbor relationship with the peer VTEP over the tunnel via the tunnel. Accordingly, the sending module 204 may send, via any tunnel configured on the VTEP, to a peer VTEP over the tunnel an ISIS LSP message containing VNIs of all VXLANs currently configured on the VTEP, where the peer VTEP is an ISIS neighbor of the VTEP. The receiving module 201 may receive, via any tunnel configured on the VTEP, from a peer VTEP over the tunnel an ISIS LSP message containing VNIs of all VXLANs currently configured on the peer VTEP, where the peer VTEP is an ISIS neighbor of the VTEP.

Figure 7:
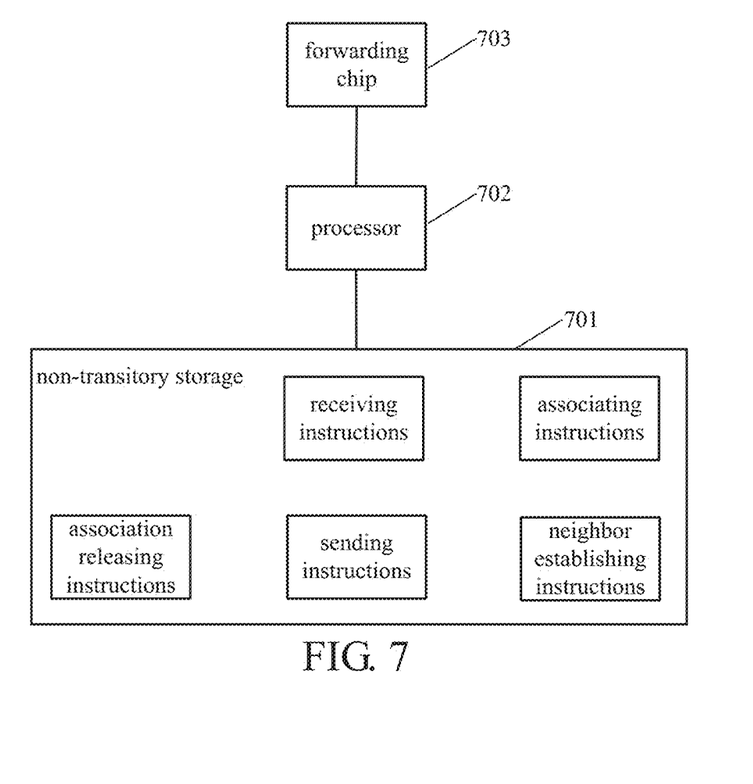
FIG. 7 is a diagram illustrating a hardware structure of an apparatus for associating a VXLAN with a tunnel according to an example of the present disclosure.

FIG. 7 is a diagram illustrating a hardware structure of an apparatus for associating a VXLAN with a tunnel according to an example of the present disclosure. The apparatus may be applied to a VTEP in a VXLAN. As shown in FIG. 7, the apparatus includes a non-transitory storage 701, a processor 702 (for example, a CPU) communicating with the non-transitory storage 701, and a forwarding chip 703.

The non-transitory storage 701 may store machine readable instructions, including receiving instructions and associating instructions that can be executed by the processor 702. The non-transitory storage 701 may further store association releasing instructions, sending instructions and neighbor establishing instructions, which are all machine readable instructions that can be executed by the processor 702.

The processor 702 may communicate with the forwarding chip 703 to process notification messages sent by the forwarding chip 703.

The processor 702 may read the receiving instructions stored in the non-transitory storage 701 to perform a process of:

receiving, via a tunnel configured on the VTEP, a notification message from a peer VTEP over the tunnel. The received notification message contains VNIs of all VXLANs currently configured on the peer VTEP.

The processor 702 may read the associating instructions stored in the non-transitory storage 701 to perform a process of:

for each of VXLANs currently configured on the VTEP, when the same VXLAN as the VXLAN configured on the VTEP exists in the VXLANs indicated by the VNIs contained in the received notification message and when the VXLAN configured on the VTEP has not already been associated with the tunnel, associating the VXLAN configured on the VTEP with the tunnel.

The processor 702 may read the association releasing instructions stored in the non-transitory storage 701 to perform a process of:

for each of VXLANs currently configured on the VTEP, when the same VXLAN as the VXLAN configured on the VTEP does not exist in the VXLANs indicated by the VNIs contained in the received notification message and when the VXLAN configured on the VTEP has already been associated with the tunnel, releasing the association of the VXLAN configured on the VTEP with the tunnel.

The processor 702 may read the neighbor establishing instructions stored in the non-transitory storage 701 to perform a process of:

before sending, via each of tunnels configured on the VTEP, the ISIS LSP message to a peer VTEP over the tunnel, establishing an ISIS neighbor relationship with the peer VTEP over the tunnel via the tunnel.

The forwarding chip 703 may be connected to other VTEPs in the VXLAN through its ports, and receive and send messages. For example, the forwarding chip 703 may send to the processor 702 messages received from other VTEPs in the VXLAN, and send to other VTEPs in the VXLAN messages received from the processor 702.

In the solution of the present disclosure, any VTEP may send, via any tunnel configured on the VTEP, to a peer VTEP over the tunnel a notification message containing VNIs of all VXLANs currently configured on the VTEP. Accordingly, any VTEP may receive, via any tunnel configured on the VTEP, from a peer VTEP over the tunnel a notification message containing VNIs of all VXLANs currently configured on the peer VTEP. Afterwards, for each of VXLANs currently configured on the VTEP, when the same VXLAN as the VXLAN configured on the VTEP exists in the VXLANs indicated by the VNIs contained in the received notification message and when the VXLAN configured on the VTEP has not already been associated with the tunnel, the VXLAN configured on the VTEP is associated with the tunnel. Accordingly, the VTEPs at both ends of the tunnel may dynamically negotiate VXLANs that can be associated with the tunnel, so as to implement the automatic association of the VXLANs configured on the VTEP with the tunnel. When the number of VXLANs and tunnels on the VTEP is large, workload for associating the VXLANs with the tunnels can be reduced by the solution of the present disclosure. Further, the configuration complexity of VXLANs may be decreased, configuration accuracy may be improved, and the management, maintenance and operation of VXLANs become easy.

When the same VXLAN as the VXLAN configured on the VTEP does not exist in the VXLANs indicated by the VNIs contained in the received notification message and when the VXLAN configured on the VTEP has already been associated with the tunnel, the association of the VXLAN configured on the VTEP with the tunnel is released. Accordingly, when a VXLAN configured on the peer VTEP is removed, the association of a VXLAN configured on the VTEP with the tunnel via which the notification message is received may be released automatically, where the VXLAN configured on the VTEP is the same as the removed VXLAN.

A tunnel may be associated with VXLANs configured on both VTEPs at both ends of the tunnel, so as to ensure that the VXLAN is reachable at both ends of the tunnel.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for associating a Virtual eXtensible Local Area Network (VXLAN) with a tunnel, applied to a local VXLAN Tunnel End Point (VTEP) in a VXLAN and comprising:

receiving, via a tunnel configured on the local VTEP, from a peer VTEP, a notification message containing VXLAN Network Identifiers (VNIs) of VXLANs currently configured on the peer VTEP; and in response to receiving the notification message from the peer VTEP, dynamically negotiating, by the local VTEP with the peer VTEP, an association of VXLANs with the tunnel based on the VNIs contained in the received notification message, by:
  in response to determining, by the local VTEP, that a first VXLAN configured on the local VTEP is the same as one of the VXLANs indicated by the VNIs contained in the notification message:
    determining, by the local VTEP, that the first VXLAN has not been associated with the tunnel; and
    associating, by the local VTEP, the first VXLAN with the tunnel; and
  in response to determining, by the local VTEP, that the first VXLAN configured on the local VTEP is not the same as any of the VXLANs indicated by the VNIs contained in the notification message:
    determining, by the local VTEP based on the VNIs contained in the received notification message, that the first VXLAN has been associated with the tunnel configured on the local VTEP; and
    releasing, by the local VTEP based on the VNIs contained in the received notification message, the association of the first VXLAN with the tunnel configured on the local VTEP.

2. The method of claim 1, further comprising:
when the VXLANs configured on the VTEP change, sending, via each of tunnels configured on the VTEP, a notification message to a peer VTEP over the tunnel, and the sent notification message containing VNIs of VXLANs currently configured on the VTEP.

3. The method of claim 1, wherein the notification message is an Intermediate System to Intermediate System (ISIS) Link State Protocol data unit (LSP) message, and a Type Length Value (TLV) in the ISIS LSP message contains the VNIs of VXLANs currently configured on the VTEP sending the ISIS LSP message.

4. The method of claim 3, before sending, via each of tunnels configured on the VTEP, the ISIS LSP message to a peer VTEP over the tunnel, further comprising:
establishing an ISIS neighbor relationship with the peer VTEP over the tunnel via the tunnel.

5. An apparatus for associating a Virtual eXtensible Local Area Network (VXLAN) with a tunnel, applied to a local VXLAN Tunnel End Point (VTEP) in a VXLAN and comprising a receiving module and an associating module,
wherein the receiving module is configured to receive, via a tunnel configured on the local VTEP, from a peer VTEP, a notification message containing VXLAN Network Identifiers (VNIs) of VXLANs currently configured on the peer VTEP; and
wherein the associating module is configured to, in response to receiving the notification message from the peer VTEP, dynamically negotiate, by the local VTEP with the peer VTEP, an association of VXLANs with the tunnel based on the VNIs contained in the received notification message, by:
  in response to determining, by the local VTEP, that a first VXLAN configured on the local VTEP is the same as one of the VXLANs indicated by the VNIs contained in the notification message received by the receiving module:
    determine, by the local VTEP, that the first VXLAN has not been associated with the tunnel; and
    associate, by the local VTEP, the first VXLAN with the tunnel; and
  in response to determining, by the local VTEP, that the first VXLAN configured on the local VTEP is not the same as any of the VXLANs indicated by the VNIs contained in the notification message:
    determine, by the local VTEP based on the VNIs contained in the received notification message, that the first VXLAN has been associated with the tunnel configured on the local VTEP; and
    release, by the local VTEP based on the VNIs contained in the received notification message, the association of the first VXLAN with the tunnel configured on the VTEP.

6. The apparatus of claim 5, further comprising:
a sending module configured to send, via each of tunnels configured on the VTEP, a notification message to a peer VTEP over the tunnel when the VXLANs configured on the VTEP change, and the sent notification message containing VNIs of VXLANs currently configured on the VTEP.

7. The apparatus of claim 5, wherein the notification message is an Intermediate System to Intermediate System (ISIS) Link State Protocol data unit (LSP) message, and a Type Length Value (TLV) in the ISIS LSP message contains the VNIs of VXLANs currently configured on the VTEP sending the ISIS LSP message.

8. The apparatus of claim 7, further comprising a neighbor establishing module configured to,
before the sending module sends, via each of tunnels configured on the VTEP, the ISIS LSP message to a peer VTEP over the tunnel, establish an ISIS neighbor relationship with the peer VTEP over the tunnel via the tunnel.

9. A non-transitory storage medium, comprising machine readable instructions, wherein a processor of a local Virtual eXtensible Local Area Network (VXLAN) Tunnel End Point (VTEP) in a VXLAN executes the machine readable instructions to implement a process of:
receiving, via a tunnel configured on the local VTEP, from a peer VTEP, a notification message containing VXLAN Network Identifiers (VNIs) of VXLANs currently configured on the peer VTEP; and
in response to receiving the notification message from the peer VTEP, dynamically negotiating, by the local VTEP with the peer VTEP, an association of VXLANs with the tunnel based on the VNIs contained in the received notification message, by:
  in response to determining, by the local VTEP, that a first VXLAN configured on the local VTEP is the same as one of the VXLANs indicated by the VNIs contained in the notification message:
    determining, by the local VTEP, that the first VXLAN has not been associated with the tunnel; and
    associating, by the local VTEP, the first VXLAN with the tunnel; and
  in response to determining, by the local VTEP, that the first VXLAN configured on the local VTEP is not the same as any of the VXLANs indicated by the VNIs contained in the notification message:
    determining, by the local VTEP based on the VNIs contained in the received notification message, that the first VXLAN has been associated with the tunnel configured on the local VTEP; and
    releasing, by the local VTEP based on the VNIs contained in the received notification message, the association of the first VXLAN with the tunnel configured on the local VTEP.

10. The non-transitory storage medium of claim 9, wherein the processor of the VTEP further executes the machine readable instructions to implement a process of:
  when the VXLANs configured on the VTEP change, sending, via each of tunnels configured on the VTEP, a notification message to a peer VTEP over the tunnel, wherein the sent notification message contains VNIs of VXLANs currently configured on the VTEP.

11. The non-transitory storage medium of claim 9, wherein the notification message is an Intermediate System to Intermediate System (ISIS) Link State Protocol data unit (LSP) message, and a Type Length Value (TLV) in the ISIS LSP message contains the VNIs of VXLANs currently configured on the VTEP sending the ISIS LSP message.

12. The non-transitory storage medium of claim 11, wherein the processor of the VTEP further executes the machine readable instructions to implement a process of:
  before sending, via each of tunnels configured on the VTEP, the ISIS LSP message to a peer VTEP over the tunnel, establishing an ISIS neighbor relationship with the peer VTEP over the tunnel via the tunnel.

* * * * *